US011947016B2

(12) United States Patent
Shin et al.

(10) Patent No.: US 11,947,016 B2
(45) Date of Patent: Apr. 2, 2024

(54) OBJECT DETECTION DEVICE AND METHOD OF OPERATING THE SAME

(71) Applicant: SAMSUNG ELECTRONICS CO., LTD., Suwon-si (KR)

(72) Inventors: Dongjae Shin, Seoul (KR); Jisan Lee, Seoul (KR); Changgyun Shin, Seongnam-si (KR); Inoh Hwang, Anyang-si (KR); Hyunil Byun, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 861 days.

(21) Appl. No.: 17/021,546

(22) Filed: Sep. 15, 2020

(65) Prior Publication Data

US 2021/0199808 A1     Jul. 1, 2021

Related U.S. Application Data

(60) Provisional application No. 62/953,755, filed on Dec. 26, 2019.

(30) Foreign Application Priority Data

Apr. 2, 2020    (KR) ........................ 10-2020-0040467

(51) Int. Cl.
  *G01S 17/04*      (2020.01)
  *G01S 17/894*     (2020.01)
  G01S 7/4865       (2020.01)
(52) U.S. Cl.
  CPC ............ *G01S 17/894* (2020.01); *G01S 17/04* (2020.01); *G01S 7/4865* (2013.01)
(58) Field of Classification Search
  None
  See application file for complete search history.

(56) References Cited

U.S. PATENT DOCUMENTS

2002/0018198 A1    2/2002 Pierenkemper
2012/0257187 A1    10/2012 Stutz et al.
(Continued)

FOREIGN PATENT DOCUMENTS

CN        110515054 A    11/2019

OTHER PUBLICATIONS

Zuowei, H., et al., "A method for Noise removal of LIDAR point clouds", 2013 Third International Conference on Intelligent System Design and Engineering Applications, 2012 IEEE, pp. 104-107.
(Continued)

*Primary Examiner* — Hovhannes Baghdasaryan
(74) *Attorney, Agent, or Firm* — Sughrue Mion, PLLC

(57) ABSTRACT

An object detection device may include: a converter configured to convert a transmission signal radiated towards an object into a digital transmission signal and a received signal reflected from the object into a digital received signal, according to a predetermined sampling period; and at least one processor configured to: interpolate between elements of the digital transmission signal and the digital received signal that have the predetermined sampling period, to obtain an interpolated transmission signal and an interpolated received signal; remove noise from each of the interpolated transmission signal and the interpolated received signal; generate a cross-correlation signal between the interpolated transmission signal from which the noise is removed and the interpolated received signal from which the noise is removed; and acquire a three-dimensional (3D) image of the object based on at least one peak value of the cross-correlation signal.

15 Claims, 16 Drawing Sheets

(56) References Cited

U.S. PATENT DOCUMENTS

| | | |
|---|---|---|
| 2017/0242109 A1 | 8/2017 | Dussan et al. |
| 2017/0322310 A1 | 11/2017 | Godbaz et al. |
| 2018/0088216 A1 | 3/2018 | Gill et al. |
| 2018/0267169 A1 | 9/2018 | Xu |
| 2019/0339388 A1 | 11/2019 | Crouch et al. |

OTHER PUBLICATIONS

Communication dated Apr. 30, 2021, issued by the European Patent Office in European Application No. 20207507.3.

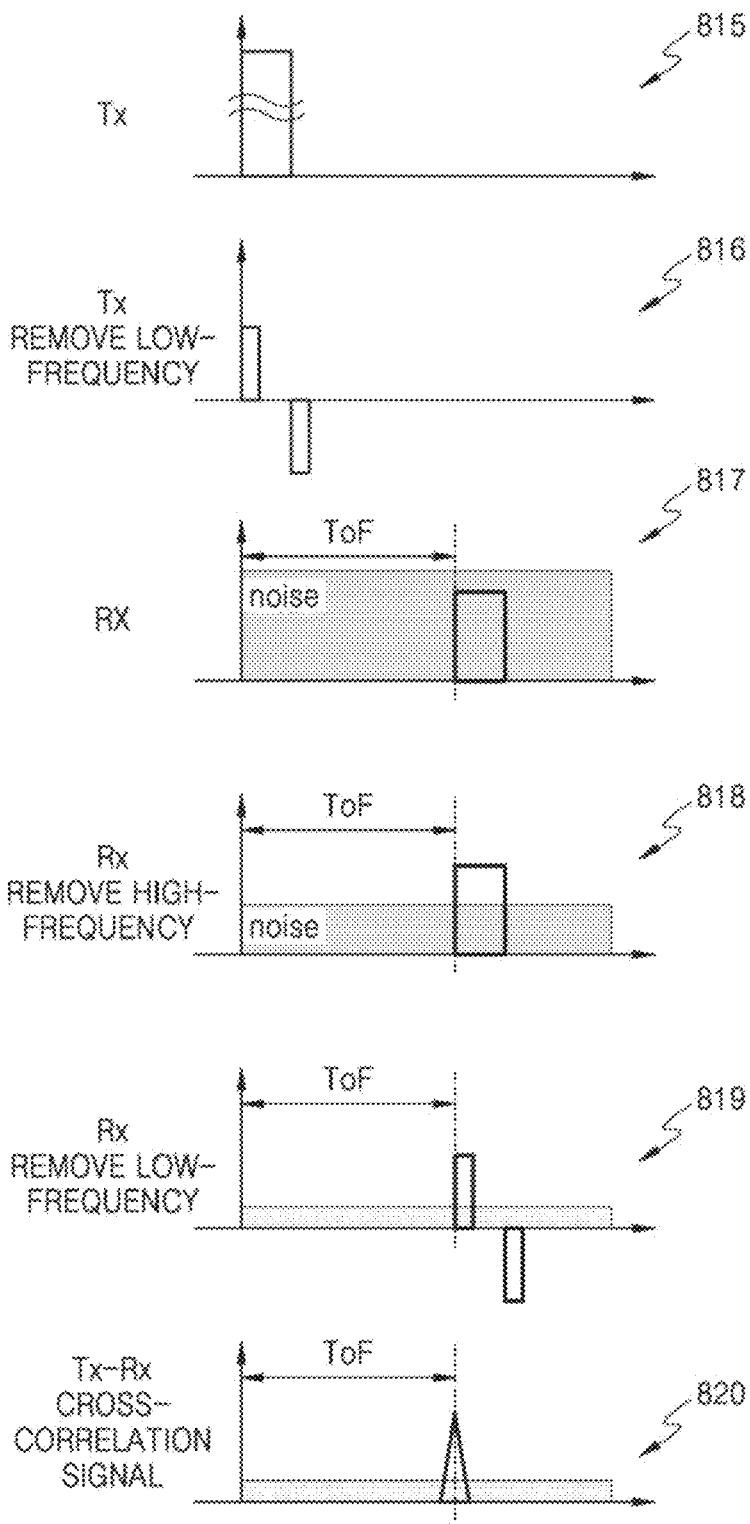

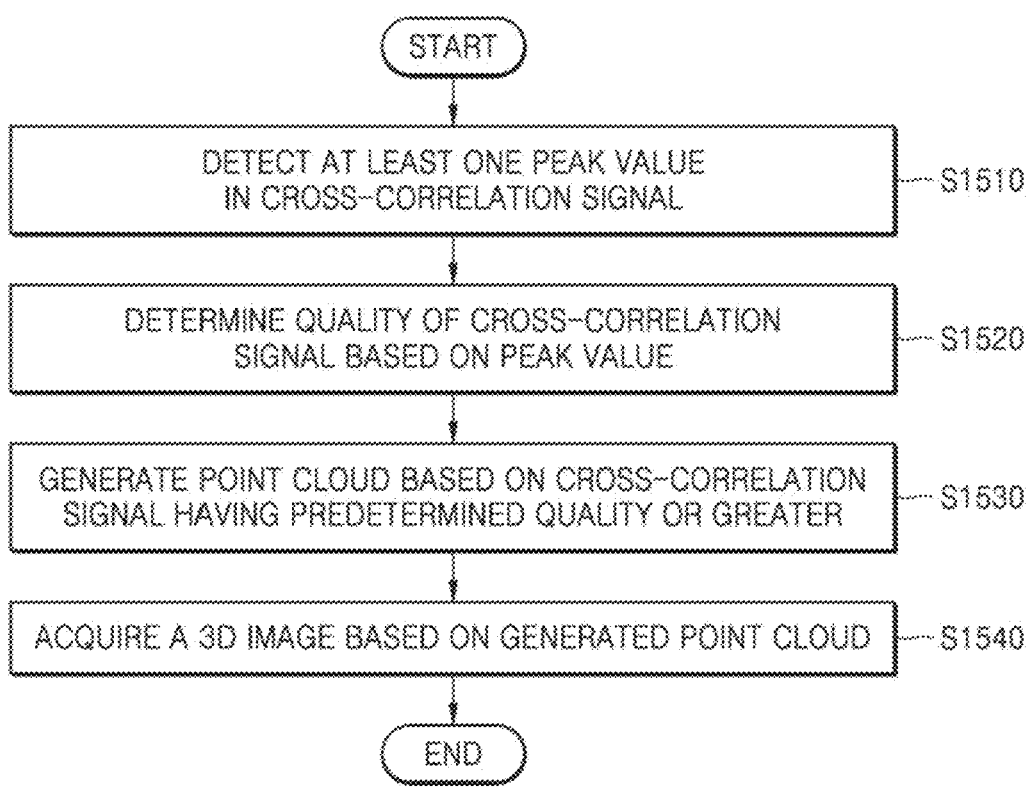

OBJECT DETECTION DEVICE AND METHOD OF OPERATING THE SAME

CROSS-REFERENCE TO RELATED APPLICATIONS

This application claims the benefit of U.S. Provisional Application No. 62/953,755, filed on Dec. 26, 2019, in the U.S. Patent Office, and Korean Patent Application No. 10-2020-0040467, filed on Apr. 2, 2020, in the Korean Intellectual Property Office, the disclosures of which are incorporated herein by reference in their entireties.

BACKGROUND

1. Field

Apparatuses and methods consistent with example embodiments relate to object detection based on an optical signal.

2. Description of Related Art

An object detection apparatus may generate a three-dimensional (3D) image of an object by measuring a time of flight (ToF) of light with respect to the object. Specifically, the object detection device may calculate a distance to the object by measuring a returning time until a light signal emitted from a light source is reflected by the object, and may generate a depth image of the object based on the calculated distance.

The object detection device calculates a ToF by converting an optical signal into a digital signal, but an object detection device of the related art uses only an analog to digital converter (ADC) to convert the optical signal into a digital signal. Thus, there is a limitation in the achievable distance resolution. Also, there is a problem that the object detection device of the related art may not provide a solution for removing low-frequency noise.

SUMMARY

Example embodiments provide object detection devices that reduce the possibility of false detection while increasing the distance resolution and methods of operating the same.

The technical problems to be achieved are not limited to the above technical problems, and other technical problems may be inferred from the following embodiments.

According to an aspect of an example embodiment, there is provided an object detection device including: a converter configured to convert a transmission signal radiated towards an object into a digital transmission signal and a received signal reflected from the object into a digital received signal, according to a predetermined sampling period; and at least one processor configured to: interpolate between elements of the digital transmission signal and the digital received signal that have the predetermined sampling period, to obtain an interpolated transmission signal and an interpolated received signal; remove noise from each of the interpolated transmission signal and the interpolated received signal; generate a cross-correlation signal between the interpolated transmission signal from which the noise is removed and the interpolated received signal from which the noise is removed; and acquire a three-dimensional (3D) image of the object based on at least one peak value of the cross-correlation signal.

The converter may be configured to output each of the transmission signal and the received signal by converting each of the transmission signal and the received signal into vector data in a form of a column vector or a row vector.

The least one processor may be further configured to interpolate between each of the elements included in the vector data.

The least one processor may be further configured to remove high-frequency noise by accumulating each of the elements included in the interpolated vector data for a predetermined time and outputting an average value of the accumulated elements, wherein the high-frequency noise may a portion of the noise having a frequency higher than a predetermined upper threshold.

The least one processor may be further configured to receive the vector data from which the high-frequency noise is removed as first input data, generate a second input data by shifting each first element included in the first input data in a predetermined direction by a predetermined size, and output third input data from which low-frequency noise is removed by subtracting each second element included in the second input data from each first element included in the first input data, wherein the low-frequency noise may be a portion of the noise having a frequency lower than a predetermined lower threshold.

The least one processor may be further configured to insert zero into the third input data when there is no second element of the second input data corresponding to any first element of the first input data.

The least one processor may be further configured to detect the at least one peak value from the cross-correlation signal, determine quality of the cross-correlation signal based on the at least one peak value, and acquire the 3D image of the object based on the quality of the cross-correlation signal.

The least one processor may be further configured to detect a first peak value having a largest absolute value among the at least one peak value of the cross-correlation signal, detect a second peak value having a second largest absolute value among the at least one peak value of the cross-correlation signal, and determine the quality of the cross-correlation signal based on the absolute value of the first peak value and the absolute value of the second peak value.

The least one processor may be further configured to generate a point cloud based on the cross-correlation signal having a quality that is greater than or equal to a predetermined reference quality, and acquire the 3D image of the object based on the generated point cloud.

According to an aspect of another example embodiment, there is provided a method for object detection, the method including: converting a transmission signal transmitted toward an object into a digital transmission signal and a received signal reflected from the object into a digital received signal, according to a predetermined sampling period; interpolating between elements of the digital transmission signal and the digital received signal that have the predetermined sampling period, to obtain an interpolated transmission signal and an interpolated received signal; removing noise from each of the interpolated transmission signal and the interpolated received signal; generating a cross-correlation signal between the interpolated transmission signal from which the noise is removed and the interpolated received signal from which the noise is removed; and acquiring a three-dimensional (3D) image of the object based on at least one peak value of the cross-correlation signal.

The converting may include converting each of the transmission signal and the received signal into vector data in a form of a column vector or a row vector, and the interpolating may include interpolating between each of the elements included in the vector data.

The removing the noise may include: accumulating each of the elements included in the vector data for a predetermined time, and removing high-frequency noise by outputting an average value of the accumulated elements; receiving the vector data from which the high-frequency noise is removed as first input data; generating second input data by shifting each first element included in the first input data in a predetermined direction by a predetermined size; and outputting third input data from which low-frequency noise is removed by subtracting each second element included in the second input data from each first element included in the first input data, wherein the high-frequency noise is a portion of the noise having a frequency higher than a predetermined upper threshold.

The outputting the third input data may include inserting zero into the third input data when there is no second element of the second input data corresponding to any first element of the first input data.

The acquiring may include: detecting the at least one peak value in the cross-correlation signal; determining quality of the cross-correlation signal based on the at least on peak value; and acquiring the 3D image of the object based on the quality of the cross-correlation signal.

The detecting may include: detecting a first peak value having a largest absolute value among the at least one peak value of the cross-correlation signal; and detecting a second peak value having a second largest absolute value among the at least one peak value of the cross-correlation signal. The determining may include determining the quality of the cross-correlation signal based on the absolute value of the first peak value and the absolute value of the second peak value. The acquiring may include: generating a point cloud based on the cross-correlation signal having a quality that is greater than or equal to a predetermined reference quality; and acquiring the 3D image of the object based on the generated point cloud.

According to an aspect of another example embodiment, there is provided an object detection device including: a converter configured to convert a plurality of analog transmission signals to be transmitted to an object to a plurality of digital transmission signals according to a first sampling period, and convert a plurality of analog received signals that are reflected from the object to a plurality of received signals according to the first sampling period; and at least one processor configured to: interpolate the plurality of digital transmission signals and the plurality of digital received signals, according to a second sampling period; combine the interpolated plurality of digital transmission signals with each other to obtained a first combination signal, and combine the interpolated plurality of digital received signals with each other to obtain a second combination signal; generate a cross-correlation signal based on the first combination signal and the second combination signal; and acquire a three-dimensional (3D) image of the object based on the cross-correlation signal.

The at least one processor may be further configured to: remove, from the interpolated plurality of digital transmission signals and the interpolated plurality of digital received signals, noise having a frequency greater than a predetermined upper threshold by combining the interpolated plurality of digital transmission signals with each other, and combining the interpolated plurality of digital received signals with each other, respectively.

The at least one processor may be further configured to: shift the first combination signal in a first predetermined direction by a first predetermined size; shift the second combination signal in a second predetermined direction by a second predetermined size; and generate the cross-correlation signal based on the shifted first combination signal and the shifted second combination signal.

The at least one processor may be further configured to: remove, from the first combination signal and the second combination signal, noise having a frequency less than a predetermined lower threshold by shifting the first combination signal and the second combination signal, respectively.

BRIEF DESCRIPTION OF THE DRAWINGS

The above and/or other aspects will be more apparent by describing certain example embodiments, with reference to the accompanying drawings, in which:

FIGS. 8A and 8B are diagrams for explaining an effect of increasing a detection distance according to removal of low frequency noise of a transmission signal and a received signal according to an example embodiment;

FIG. 15 is a flowchart for explaining a method of acquiring a 3D image in the method of FIG. 12 according to an example embodiment.

DETAILED DESCRIPTION

Figure 1:
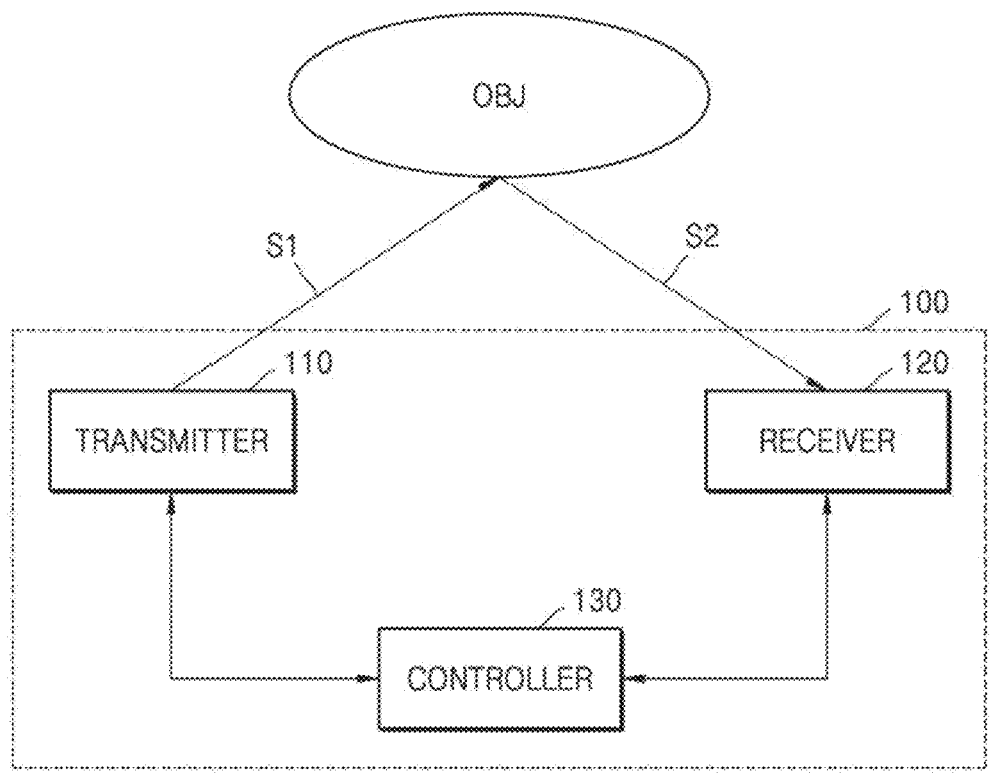
FIG. 1 is a diagram for explaining an operation of an object detection device according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

The phrases "in some embodiments" or "in one embodiment" appearing in various places in this specification are not necessarily all referring to the same embodiment.

Some embodiments of the present disclosure may be expressed as functional block configurations and various processing steps. Some or all of the functional blocks may be implemented in various numbers of hardware and/or software configurations that perform particular functions. For example, the functional blocks of the present disclosure may be implemented by one or more microprocessors or by circuit configurations for a given function. Also, for example, the functional blocks of the present disclosure may be implemented in various programming or scripting languages. The functional blocks may be implemented in algorithms running on one or more processors. In addition, the present disclosure may employ the related art for electronic configuration, signal processing, and/or data processing. Terms, such as "mechanism", "element", "means" and "configuration" may be used widely and are not limited to mechanical and physical configurations.

In addition, the connecting lines or connecting members between the components shown in the drawings are merely illustrative of functional connections and/or physical or circuit connections. In a practical device, the connections between the components may be represented by various functional connections, physical connections, or circuit connections that may be replaced or added.

FIG. 1 is a diagram for explaining an operation of an object detection device 100 according to an example embodiment.

Referring to FIG. 1, the object detection device 100 includes a transmitter 110 configured to radiate a transmission signal S1 toward an object OBJ, a receiver 120 configured to receive a received signal S2 reflected from the object OBJ, and a controller 130 configured to control the transmitter 110 and the receiver 120. The controller 130 may include at least one processor and at least one memory.

The object detection device 100 may be a three-dimensional (3D) sensor that generates a 3D image of the object OBJ. For example, the object detection device 100 may include a light detection and ranging (LiDAR), a radar, etc., but is not limited thereto.

The transmitter 110 may output light to be used for analyzing a location, shape, etc. of the object OBJ. For example, the transmitter 110 may output light having an infrared band wavelength. When light in the infrared band is used, the mixing with natural light in the visible light band including sunlight may be prevented. However, it is not necessarily limited to the infrared band, and the transmitter 110 may emit light of various wavelength bands.

The transmitter 110 may include at least one light source. For example, the transmitter 110 may include a light source, such as a laser diode (LD), an edge emitting laser, a vertical-cavity surface emitting laser (VCSEL), a distributed feedback laser, a light emitting diode (LED), a super luminescent diode (SLD), etc.

The transmitter 110 may also generate and output light of a plurality of different wavelength bands. Also, the transmitter 110 may generate and output pulsed light or continuous light. Light generated by the transmitter 110 may be radiate toward the object OBJ as the transmission signal S1.

According to an example embodiment, the transmitter 110 may further include a beam steering device for changing the radiation angle of the transmission signal S1. For example, the beam steering device may be a scanning mirror or an optical phased array.

The controller 130 may control the transmitter 110 to change the radiation angle of the transmission signal S1. The controller 130 may control the transmitter 110 so that the transmission signal S1 scans the entire object OBJ. In one embodiment, the controller 130 may control the transmitter 110 so that the transmission signal S1 output from each of a plurality of light sources scans the object OBJ at different radiation angles. In another example embodiment, the controller 130 may control the transmitter 110 so that the transmission signal S1 output from each of the plurality of light sources scans the object OBJ at the same radiation angle.

The receiver 120 may include at least one light detection element, and the light detection element may separately detect and receive the received signal S2 reflected from the object OBJ. According to an example embodiment, the receiver 120 may further include an optical element for collecting the received signal S2 to a predetermined light detection element.

The predetermined light detection element may be a sensor capable of sensing light and may be, for example, a light receiving device configured to generate an electrical signal by light energy. The type of the light receiving device is not specifically limited.

The controller 130 may perform signal processing for acquiring information about the object OBJ by using the received signal S2 detected by the receiver 120. The controller 130 may determine a distance to the object OBJ based on the flight time of light output by the transmitter 110 and perform data processing for analyzing the position and shape of the object OBJ. For example, the controller 130 may generate a point cloud based on the distance information to the object OBJ and acquiring a 3D image of the object OBJ based on the point cloud.

The 3D image acquired by the controller 130 may be transmitted to another unit to use. For example, the information may be transmitted to a controller of an autonomous driving device, such as a driverless vehicle or drone in which the object detection apparatus 100 is employed. Besides above, the information may be utilized in smartphones, mobile phones, personal digital assistants (PDAs), laptops, personal computers (PCs), wearable devices, and other mobile or non-mobile computing devices.

Also, the controller 130 may control an overall operation of the object detection device 100 including the control of the transmitter 110 and the receiver 120. For example, the controller 130 may perform power supply control, on/off control, pulse wave (PW) or continuous wave (CW) generation control, etc. with respect to the transmitter 110.

The object detection device 100 of the present disclosure may further include other general-purpose components in addition to the components of FIG. 1.

For example, the object detection device 100 may further include a memory for storing various data. The memory may store data processed and to be processed by the object detection device 100. Also, the memory may store applications, drivers, etc. to be driven by the object detection device 100.

The memory may include random access memory (RAM), such as dynamic random access memory (DRAM) and static random access memory (SRAM), read-only memory (ROM), electrically erasable programmable read-only memory (EEPROM), CD-ROM, blue Ray or other optical disk storage, hard disk drive (HDD), solid state drive (SSD), or flash memory, and may further include other external storage devices that may be accessed to the object detection device 100.

Figure 2:
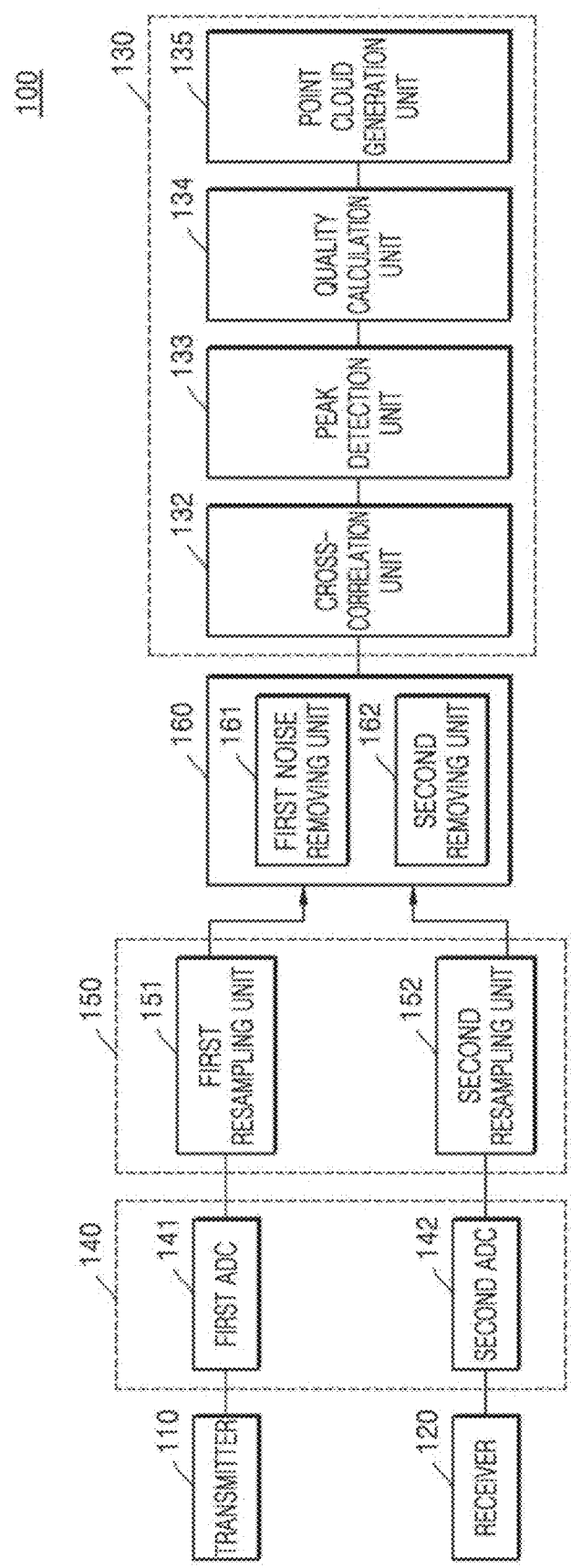
FIG. 2 is an internal block diagram of an object detection device according to an example embodiment.

FIG. 2 is an internal block diagram of an object detection device 100 according to an example embodiment.

Referring to FIG. 2, the object detection device 100 may include a transmitter 110, a receiver 120, a converter 140, an interpolation unit 150, a filter unit 160, and a controller 130. The interpolation unit 150, the filter unit 160, and the controller 130 may be implemented by one or more processors.

The transmitter 110 may output a transmission signal toward an object. Also, the transmitter 110 may output a part of the transmission signal to the converter 140. The part of the transmission signal may be used to calculate a flight time of light. The receiver 120 may receive a received signal reflected from the object. The transmitter 110 of FIG. 2 may correspond to the transmitter 110 of FIG. 1, and the receiver 120 of FIG. 2 may correspond to the receiver 120 of FIG. 1.

The converter 140 may convert each of the transmission signal and the received signal into a digital signal according to a predetermined sampling period. For example, the sampling period may be set in a range of 100 Hz to 10 GHz. The converter 140 may output digital signals as vector data in the form of column vectors or row vectors. The vector data may denote an array in the form of a column vector or a row vector including a set of elements. Quantized values of a transmission signal and a received signal may be stored in each element.

In detail, the converter 140 may include a first analog-to-digital converter 141 and a second analog-to-digital converter 142.

The first analog-to-digital converter 141 may convert a transmission signal into a first digital signal based on a predetermined sampling period. In other words, the first digital signal may be a converted transmission signal. The first analog-to-digital converter 141 may output the first digital signal in the form of a column vector or a row vector. A quantized value of the transmission signal according to the sampling period may be stored in each element.

The second analog-to-digital converter 142 may convert the received signal into a second digital signal based on the predetermined sampling period. In other words, the second digital signal may be a converted received signal. The second analog-to-digital converter 142 may output the second digital signal in the form of a column vector or a row vector. A quantized value of the received signal according to the sampling period may be stored in each element.

The first analog-to-digital converter 141 may output the first digital signal to the first resampling unit 151 included in the interpolation unit 150. The second analog-to-digital converter 142 may output the second digital signal to the second resampling unit 152 included in the interpolation unit 150.

The interpolation unit 150 may interpolate the first digital signal and the second digital signal by predicting elements between sampling periods. The interpolation unit 150 may interpolate between each of the elements included in the vector data. For example, the interpolation unit 150 may interpolate the first digital signal and the second digital signal by using at least one of a linear interpolation method, a polynomial interpolation method, a spline interpolation method, an exponential interpolation method, a log-linear interpolation method, a Lagrange interpolation method, a Newton interpolation method, and a bilinear interpolation method. However, the interpolation methods described above are only examples and various interpolation methods for interpolating the first digital signal and the second digital signal may be used.

The interpolation unit 150 may interpolate between sampling periods according to a predetermined interpolation period. The predetermined interpolation period may be set in the range of 2 to 20. In other words, the interpolation unit 150 may interpolate the first digital signal and the second digital signal by dividing the sampling period into 2 to 20 sections. For example, when the sampling period is 100 Hz, the interpolation unit 150 may interpolate the first digital signal and the second digital signal by predicting the element corresponding to 50 Hz.

The interpolation unit 150 may include the first resampling unit 151 and the second resampling unit 152. The first resampling unit 151 may interpolate the first digital signal and the second resampling unit 152 may interpolate the second digital signal. In an example embodiment, resampling (e.g., upscaling such as interpolation) of sampled signals may be performed before integrating, accumulating, or combining the sampled signals, to obtain additional information and improve the distance resolution.

The first resampling unit 151 may output an interpolated first digital signal to the filter unit 160, and the second resampling unit 152 may output an interpolated second digital signal to the filter unit 160.

The interpolated first digital signal may be referred to as an interpolated transmission signal and the interpolated second digital signal may be referred to as an interpolated received signal.

Since the object detection device 100 of the present disclosure increases a sampling rate through the interpolation unit 150, the distance resolution is significantly increased without changing a design of hardware (for example, without using an analog-to-digital converter with a high sampling rate).

The filter unit 160 may remove noise of each of the interpolated transmission signal and the interpolated received signal. The filter unit 160 may remove high-frequency noise of the interpolated transmission signal and the interpolated received signal. Also, the filter unit 160 may remove low-frequency noise of the interpolated transmission signal and the interpolated received signal. In particular, the filter unit 160 may remove, from the interpolated transmission signal and the interpolated received signal, one or more portions where the interpolated transmission signal and the interpolated received signal have a frequency greater than a predetermined upper threshold or less than a predetermined lower threshold. To this end, the filter unit 160 may include a first noise removing unit 161 and a second noise removing unit 162. For example, the filter unit 160 may suppress or remove high-frequency noise through an integration, and may suppress or remove low-frequency noise through a differentiation.

The first noise removing unit 161 may remove high-frequency noise of the interpolated transmission signal and the interpolated received signal. According to an example embodiment, the first noise removing unit 161 may remove only high-frequency noise of the interpolated received signal.

In detail, since the converter 140 outputs the transmission signal and the received signal in the form of vector data and the interpolation unit 150 interpolates between each of the elements included in the vector data, the first noise removing unit 161 may receive the interpolated transmission signal in the form of vector data.

The first noise removing unit 161 may accumulate or combine each element included in the interpolated vector data for a predetermined time. Also, the first noise removing unit 161 may remove high-frequency noise by outputting an average value of the accumulated elements. At this time, the predetermined time may be 0.01 ms, but is not limited thereto.

For example, when the first noise removing unit 161 receives first row vector data and second row vector data for a predetermined time, elements included in the first row vector data respectively are 2, 4, 7, and 9, and elements included in the second row vector data respectively are 3, 5, 4, and 9, the first noise removing unit 161 may obtain cumulative row vector data having 5, 9, 11, and 18 as elements. Also, the first noise removing unit 161 may output average row vector data having 2.5, 4.5, 5.5, and 9 as average elements of the cumulative row vector data.

When the first noise removing unit 161 accumulates vector data for a predetermined time and outputs an average value of the vector data, high-frequency noise of the interpolated transmission signal and the interpolated received signal may be removed.

The second noise removing unit 162 may remove low-frequency noise of the interpolated transmission signal and the interpolated received signal.

In detail, the second noise removing unit 162 may receive vector data from which high-frequency noise is removed as first input data. Also, the second noise removing unit 162 may generate second input data by element shifting each element included in the first input data in a predetermined direction and a predetermined size.

The predetermined direction may be any one of left, right, upper and lower directions. When the vector data is a row vector, the predetermined direction may be set to left or right. In this point, the left side may denote a direction in which a column address of the vector data decreases, and the right side may denote a direction in which the column address of the vector data increases. Also, when the vector data is a column vector, the predetermined direction may be set to an upper side or a lower side. At this point, the upper side may denote a direction in which a row address of the vector data decreases, and the lower side may denote a direction in which the row address of the vector data increases. The predetermined size may be set to 500 elements.

The second noise removing unit 162 may output third input data from which low-frequency noise is removed by subtracting each element included in the second input data from each element included in the first input data.

When the third input data from which the low-frequency noise is removed is generated, the second noise removing unit 162 may insert zero into a vacant position generated by shifting the first input data. The third input data from which low-frequency noise is removed may be provided to a cross-correlation unit 132 as a first digital signal from which noise is removed. In other words, the second noise removing unit 162 may remove low-frequency noise of the interpolated first digital signal and output the first digital signal from which noise is removed to the cross-correlation unit 132 of the controller 130. Also, the second noise removing unit 162 may remove low-frequency noise of the interpolated second digital signal and output the second digital signal from which the noise is removed to the cross-correlation unit 132 of the controller 130.

The first digital signal from which noise is removed may be referred to as a transmission signal from which noise is removed, and the second digital signal from which noise is removed may be referred to as a received signal from which noise is removed.

Since the object detection device 100 of the present disclosure removes not only high-frequency noise of the transmission signal and the received signal, but also low-frequency noise thereof, the detection distance is significantly increased.

The controller 130 may generate a cross-correlation signal indicating a correlation between the transmission signal from which noise is removed and the received signal from which noise is removed. Also, the controller 130 may detect at least one peak value from the cross-correlation signal. Also, the controller 130 may determine the quality of a cross-correlation signal based on a peak value of the cross-correlation signal. Also, the controller 130 may acquire a 3D image of an object based on the quality of the cross-correlation signal. To this end, the controller 130 may include the cross correlation unit 132, a peak detection unit 133, a quality calculation unit 134, and a point cloud generation unit 135.

The cross-correlation unit 132 may receive a transmission signal from which noise is removed and a received signal from which noise is removed from the filter unit 160.

The cross-correlation unit 132 may generate a cross-correlation signal between the transmission signal from which noise is removed and the received signal from which noise is removed. To this end, the cross-correlation unit 132 may include a correlator. In one embodiment, the cross-correlation unit 132 may generate a cross-correlation signal by Equation 1 below.

$$S3(\tau) = \int_{-\infty}^{\infty} S1(t)S2(t+\tau)dt \qquad \text{[Equation 1]}$$

In Equation 1, S1 may denote a transmission signal, S2 may denote a received signal, and S3 may denote a cross-correlation signal.

The cross-correlation unit 132 may output a cross-correlation signal to the peak detection unit 133.

The peak, detection unit 133 may detect at least one peak value from the cross-correlation signal. The peak detection unit 133 may detect a first peak value having the largest absolute value among peak values of the cross-correlation signal. Also, the peak detection unit 133 may detect a second peak value having the largest absolute value among remaining peak values excluding the first peak value. The peak detection unit 133 may output the first peak value and the second peak value to the quality calculation unit 134.

The quality calculation unit 134 may calculate the quality of the cross-correlation signal based on an absolute value of the first peak value and an absolute value of the second peak value.

The quality calculation unit 134 may provide quality information of the cross-correlation signal to the point cloud generation unit 135.

The point cloud generation unit 135 may generate a point cloud based on the quality information of the cross-correlation signal. Also, the point cloud generation unit 135 may acquire a 3D image of an object based on a point cloud.

In detail, the point cloud generation unit 135 may generate a point cloud based on a cross-correlation signal having a predetermined reference quality or greater. For example, the reference quality may be set to 2, but is not limited thereto.

The point cloud generation unit 135 may calculate a transmission time of a transmission signal and a receiving time of a received signal based on the first peak value of a cross-correlation signal having a reference quality or greater. Also, the point cloud generation unit 135 may calculate a flight time of light output from the transmitter 110 based on the transmission time and the receiving time. Also, the point cloud generation unit 135 may calculate a distance to an object based on the flight time of light. Also, the point cloud generation unit 135 may generate a 3D point cloud based on distance information to the object.

The point cloud generation unit 135 may ignore a peak value of the cross-correlation signal below the reference quality. Also, the point cloud generation unit 135 may map maximum detection distance information to a point cloud corresponding to a cross-correlation signal having a quality less than a reference quality. For example, when the maximum detection distance of the object detection device 100 is 200 m, the point cloud generation unit 135 may uniformly store 200 m of distance information in the point cloud corresponding to a cross-correlation signal having a quality less than a reference quality.

Since the object detection device 100 according to an example embodiment generates a point cloud in consideration of the quality of the cross-correlation signal, there is an effect of significantly reducing the possibility of false detection of an object.

In FIG. 2, although it is depicted that the converter 140, the interpolation unit 150, and the filter unit 160 are shown in separate configurations from the controller 130, but according to an example embodiment, the converter 140, interpolation unit 150, and the filter unit 160 may be included in the controller 130 as partial configurations of the controller 130. Also, according to an example embodiment, the cross-correlation unit 132, the peak detection unit 133, the quality calculation unit 134, and the point cloud generation unit 135 in the control unit 130 may be operated as additional configurations separately from the control unit 130.

Figure 3:
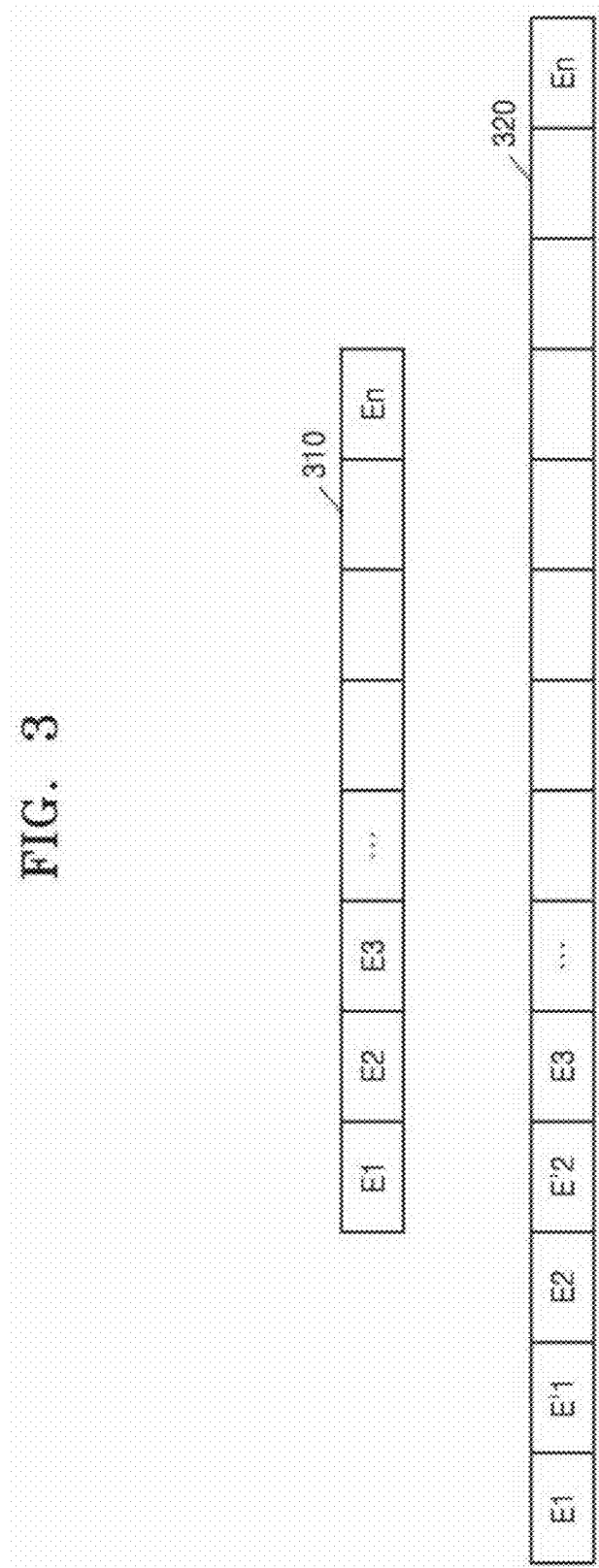
FIG. 3 is a diagram for explaining a method of interpolating a transmission signal and a received signal according to an example embodiment.

FIG. 3 is a diagram for explaining a method of interpolating a transmission signal and a received signal according to an example embodiment.

Referring to FIG. 3, the converter 140 may convert a transmission signal and a received signal into vector data in the form of a column vector or a row vector and may output the vector data. In FIG. 3 or below, the converter 140 outputs the transmission signal and the received signal as vector data 310 in the form of row vectors, but the following description is also applicable to vector data of a column vector form. At this point, the left direction and the right direction of the row vector may correspond to an upper direction and a lower direction of the column vector, respectively.

The interpolation unit 150 may interpolate the vector data 310 by predicting elements between sampling periods. Since quantized values of the transmission signal and the received signal based on the sampling period are stored in each element of the vector data 310, the meaning that the interpolation unit 150 interpolates between sampling periods may be the same as the meaning that the interpolation unit 150 interpolates between each element included in the vector data 310.

The interpolation unit 150 may interpolate between the first element E1 and the second element E2 of the vector data 310.

Specifically, the interpolation unit 150 may calculate an average value of the first element E1 value and the second element E2 value. The interpolation unit 150 may insert an average value of the first element E1 value and the second element E2 value between the first element E1 and the second element E2 as a first interpolation element E1'. Also, the interpolation unit 150 may insert an average value of the second element E2 value and the third element E3 value between the second element E2 and the third element E3 as a second interpolation element E2'.

The interpolation unit 150 may interpolate between each element included in the vector data 310 through the method described above. However, interpolation between elements through an average value is only an example and is not limited thereto. In other words, various interpolation methods for interpolating the vector data 310 may be used.

In FIG. 3, vector data 320 interpolated through any one of various interpolation methods is illustrated.

As shown in FIG. 3, the object detection device 100 according to an example embodiment has an effect of significantly increasing sampling rates of the transmission signal and the received signal without using a high sampling rate analog-to-digital converter.

The interpolation unit 150 according to an example embodiment is disposed between the converter 140 and the filter unit 160 to interpolate the transmission signal before high frequency noise is removed and the received signal before high frequency noise is removed.

When the interpolation unit 150 interpolates the transmission signal before the high frequency noise is removed and the received signal before the high frequency noise is removed, there is an effect that the distance resolution of the object detection device 100 is significantly increased. The effect of increasing the distance resolution according to the interpolation of the transmission signal and the received signal will be described in more detail with reference to FIGS. 4 to 5.

Figure 4:
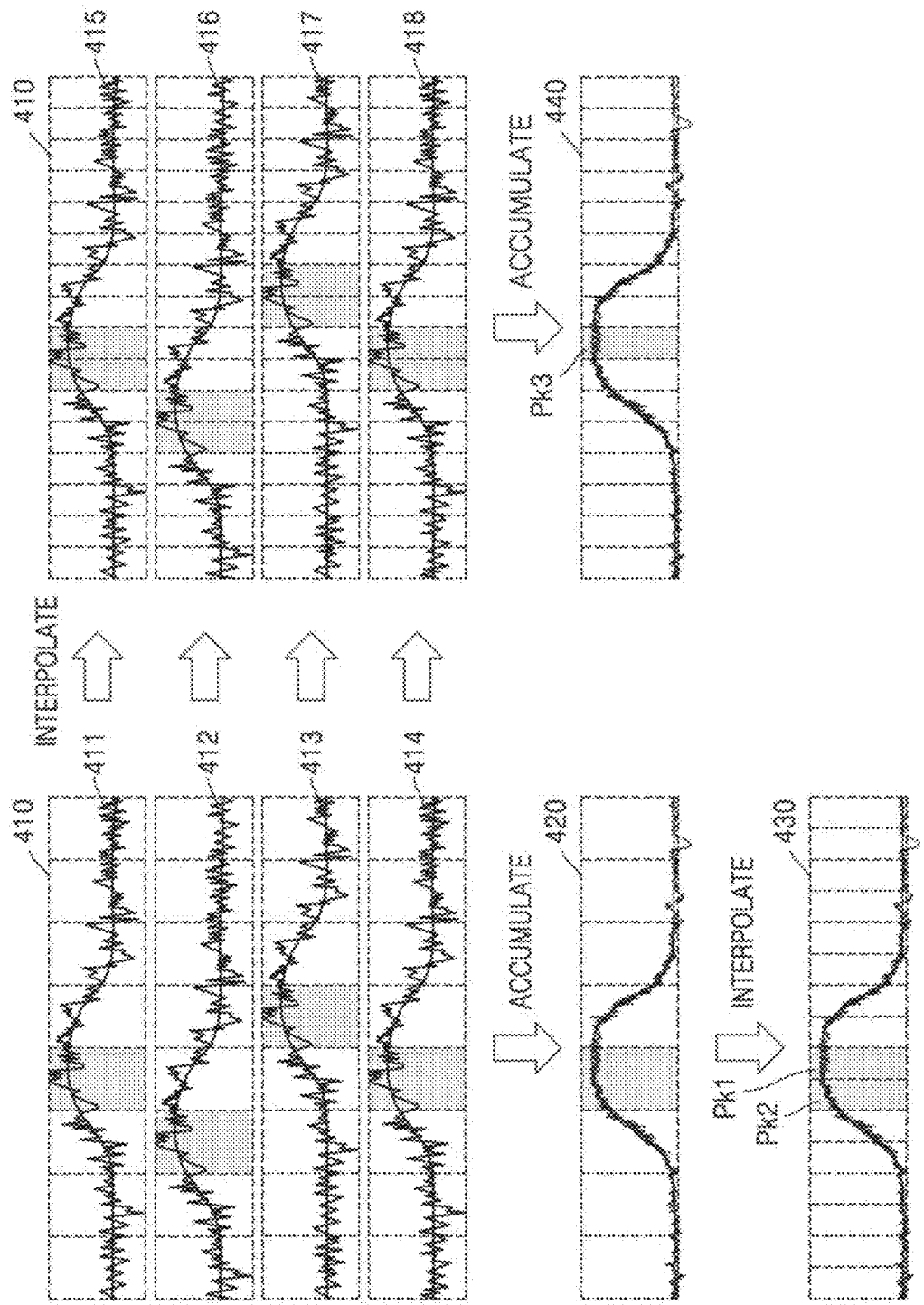
FIG. 4 is a diagram for explaining an effect of increasing a distance resolution according to interpolation of a transmission signal and a received signal according to an example embodiment.
Figure 5:
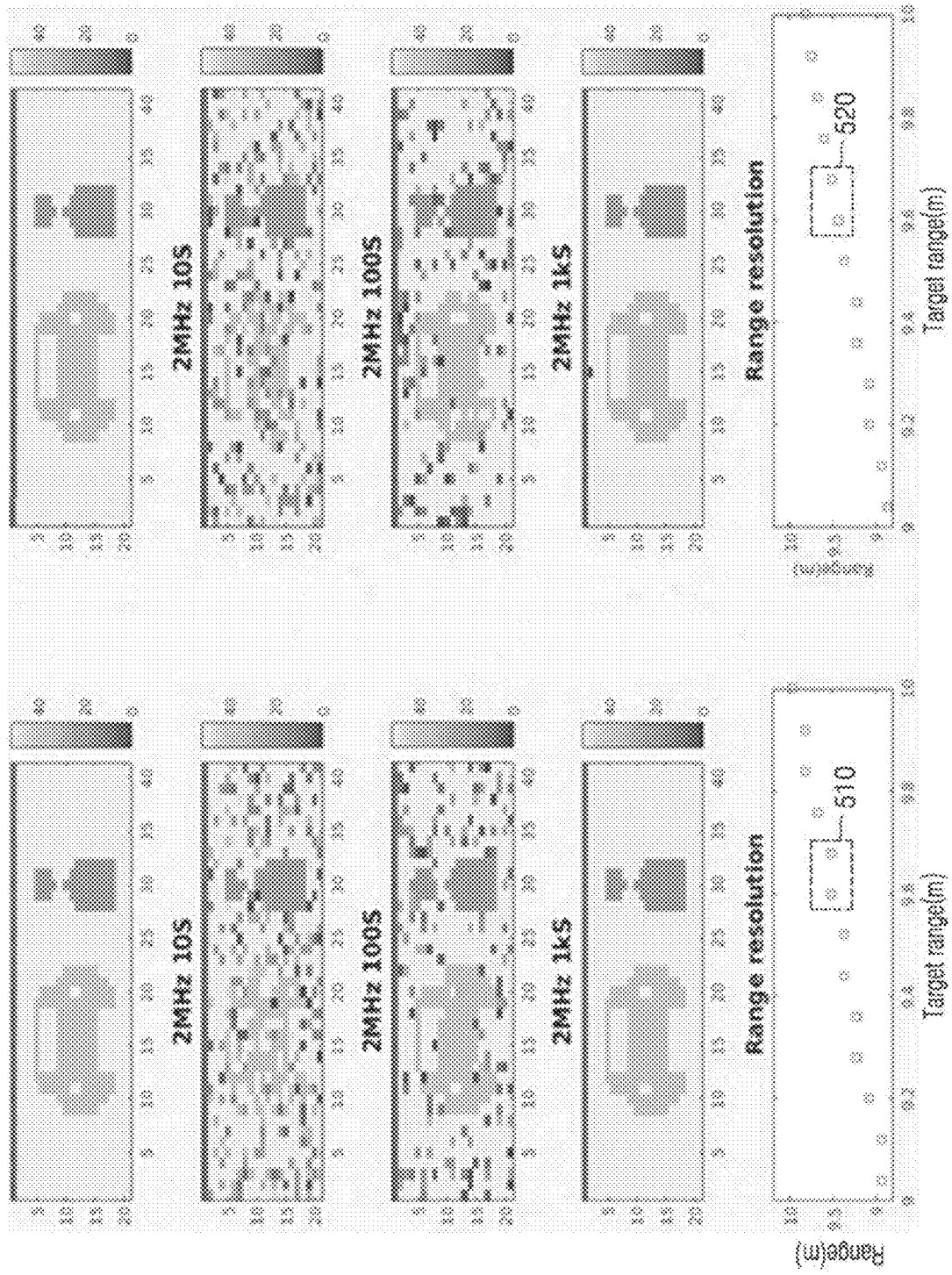
FIG. 5 is a diagram for explaining an effect of increasing a distance resolution according to interpolation of a transmission signal and a received signal according to an example embodiment.

FIG. 4 is a diagram for explaining an effect of increasing a distance resolution according to interpolation of a transmission signal and a received signal. FIG. 5 is a diagram for explaining an effect of increasing a distance resolution according to interpolation of a transmission signal and a received signal.

For convenience of explanation, in FIGS. 4 to 5, the effect of increasing the distance resolution is described using the received signal, but the following description may also be applied to the transmission signal.

Referring to FIG. 4, received signals 410 are depicted in FIG. 4. When the object detection device 100 interpolates the received signal after removing high frequency noise, the object detection device 100 may accumulate the received signals 410. A first accumulated signal 420 accumulated by the object detection device 100 may be interpolated. Since the object detection device 100 interpolates the first accumulated signal 420 in a state that the received signals 410 are accumulated, the interpolated first accumulated signal 430 may include a plurality of peak values Pk1 and Pk2.

As shown in FIG. 4, when the object detection device 100 interpolates the accumulated first cumulative signal 420 after accumulating the received signals 410, the sampling rate may increase but the distance resolution may not increase. On the other hand, the object detection device 100 according to an example embodiment may increase the distance resolution by interpolating the received signal before removing high frequency noise.

Specifically, the object detection device 100 according to an example embodiment may resample, upscale, or interpolate the respective received signals 411, 412, 413, and 414. Also, the object detection device 100 may resample, upscale, or accumulate each of the interpolated received signals 415, 416, 417, and 418. When the object detection device 100 interpolates each of the received signals 411, 412, 413, and 414 and then accumulates the interpolated received signals 415, 416, 417, and 418, one peak value Pk3 may be included in a second accumulated signal 440.

As depicted in FIG. 4, when the object detection device 100 interpolates each of the received signals 411, 412, 413, and 414 and then accumulates the interpolated received signals 415, 416, 417, and 418, a distance to an object may be further finely classified. In other words, since the object detection device 100 according to an example embodiment interpolates each of the received signals 411, 412, 413, and 414 and then accumulates the interpolated received signals 415, 416, 417, and 418, the distance resolution may be significantly increased.

FIG. 5 shows a first distance resolution graph 510 representing a case in which the object detection device 100 accumulates the received signals 410, and afterwards, interpolates the accumulated first cumulative signal 420, and a second distance resolution graph 520 representing a case in which the object detection device 100 interpolates each of the received signals 411, 412, 413, and 414, and afterwards, accumulates the interpolated respective received signals 415, 416, 417, and 418.

As shown in FIG. 5, when the object detection device 100 interpolates the accumulated first signal 420 after accumulating the received signals 410, a distance of 8 cm may not be distinguished, but when the object detection device 100 interpolates the received signals 411, 412, 413, and 414, and then accumulates the interpolated received signals 415, 416, 417, and 418, the distance of 8 cm is distinguished. In other words, the object detection device 100 according to an example embodiment may significantly increase the distance resolution.

Figure 6:
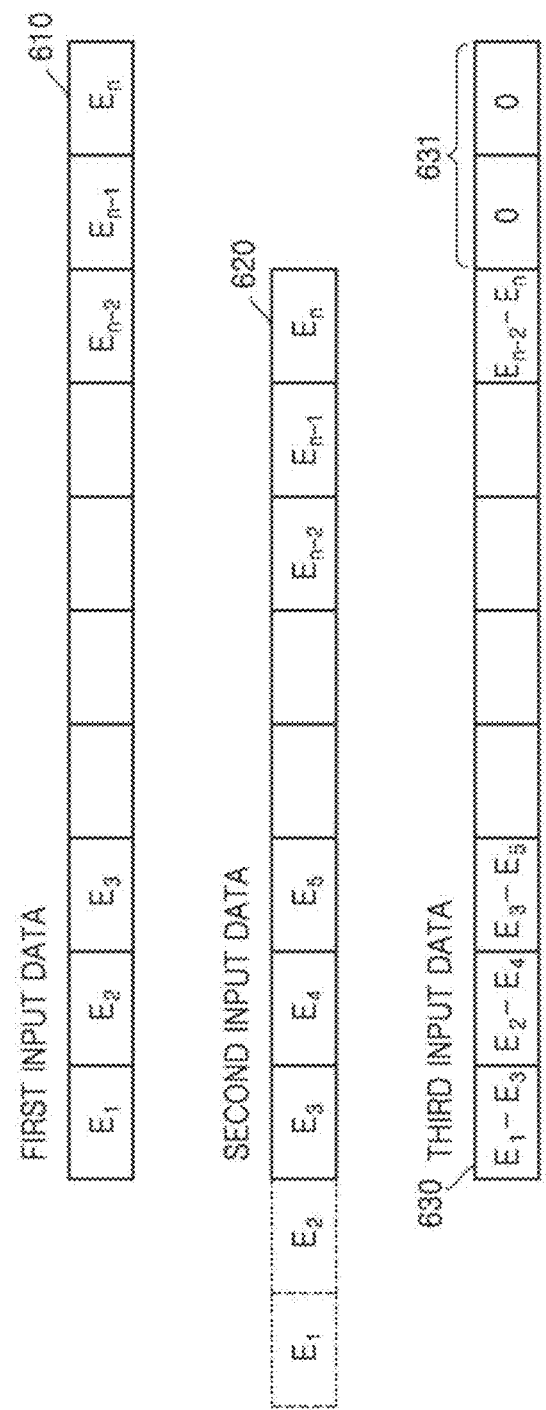
FIG. 6 is a diagram for explaining a method of removing low-frequency noise of a transmission signal and a received signal according to an example embodiment.

FIG. 6 is a diagram for explaining a method of removing low-frequency noise of a transmission signal and a received signal according to an example embodiment.

Referring to FIG. 6, the second noise removing unit 162 may receive vector data from which high-frequency noise is removed as a first input data 610.

The second noise removing unit 162 may generate a second input data 620 by shifting each element included in the first input data 610 in a predetermined direction and a predetermined size. When shifting the element, the second noise removing unit 162 may delete elements outside the column address range. Accordingly, the second input data 620 may have a length less than that of the first input data 610.

In detail, when the first input data 610 is in the form of a row vector, the second noise removing unit 162 may element-shift the first input data 610 to the left or right. In this case, the left side may denote a direction in which the column address of the row vector decreases, and the right side may denote a direction in which the column address of the row vector increases. Also, the second noise removing unit 162 may element-shift the first input data 610 by 1 to 500 elements.

For example, as illustrated in FIG. 6, the second noise removing unit 162 may generate the second input data 620 by shifting the first input data 610 by 2 elements in the left direction. At this point, the third element E3 included in the first input data 610 may be disposed in the first column of the second input data 620 by reducing the column address by 2. Also, the first element E1 and the second element E2 outside the column address range may be deleted.

The second noise removing unit 162 may generate a third input data 630 from which the low-frequency noise is removed by subtracting each element included in the second input data 620 from each element included in the first input data 610 based on a column address.

On the other hand, when generating the third input data 630, the second noise removing unit 162 may insert zero in a vacant position 631 of the third input data 630 generated by the shift of the first input data 610.

Specifically, the second noise removing unit 162 may subtract elements disposed at column addresses corresponding to each other in the first input data 610 and the second input data 620.

The second noise removing unit 162 may store the subtracted element in the third input data 630. At this point, the second noise removing unit 162 may store the subtracted element at a position of the third input data 630 corresponding to the column addresses of the first input data 610 and the second input data 620. For example, when, among elements included in the first input data 610 and the second input data 620, elements disposed at position (1, 1) are subtracted, the second noise removing unit 162 may store the subtracted elements at position (1, 1) of the third input data 630.

When there is no element of the second input data 620 corresponding to the element selected from the first input data 610, the second noise removing unit 162 may insert zero at the position of the third input data 630 corresponding to the column address of the first input data 610. For example, in FIG. 6, since there is no second input data corresponding to positions (1, 9) and (1, 10) of the first input data 610, the second noise removing unit 162 may insert zero into the positions (1, 9) and (1, 10) of the third input data 630.

Figure 7:
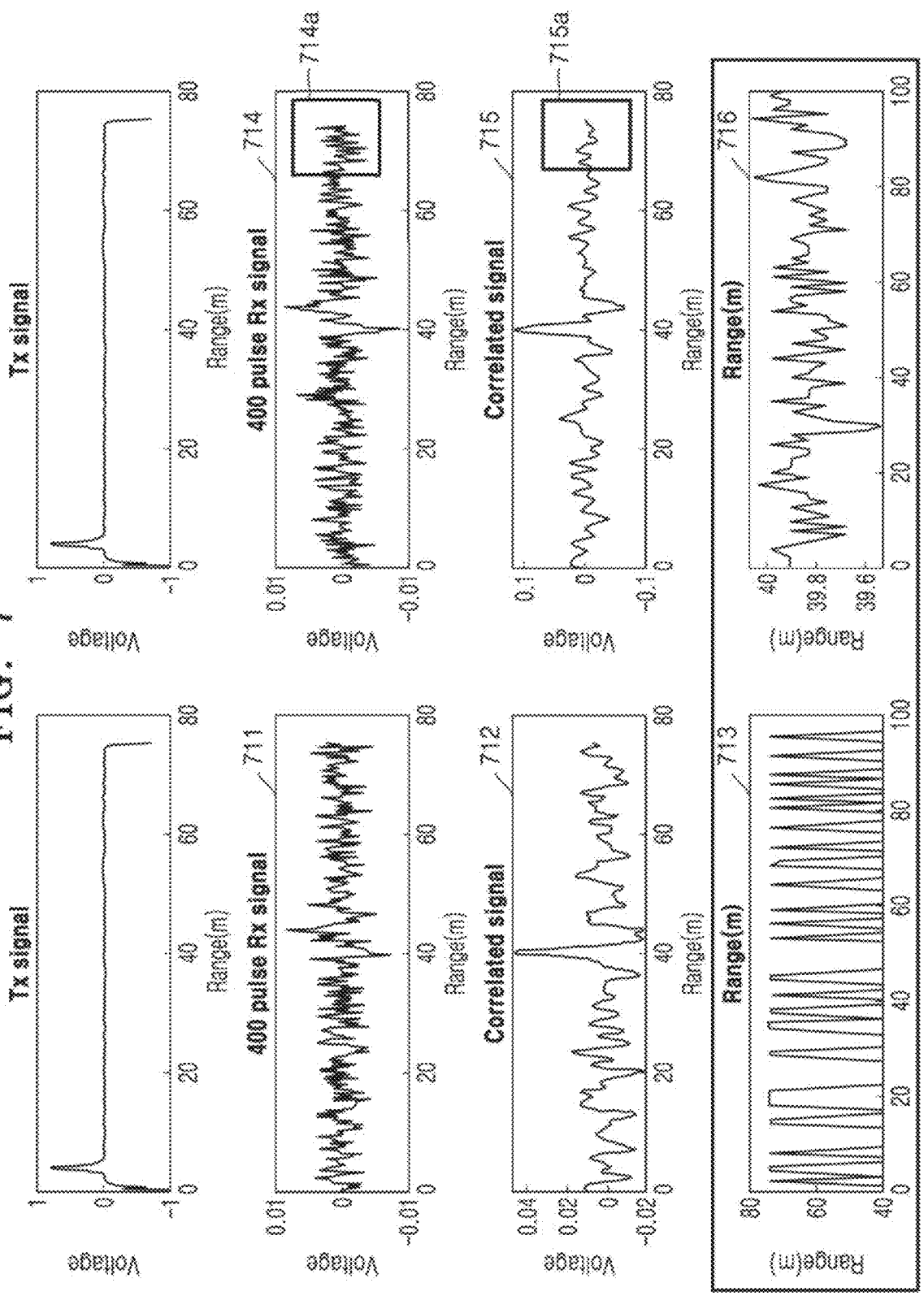
FIG. 7 is a diagram for explaining an effect generated when zero is inserted into a vacant position of a third input data according to an example embodiment.

FIG. 7 is a diagram for explaining an effect generated when zero is inserted into a vacant position of a third input data.

FIG. 7 shows, when zero is not inserted into vacant positions of the third input data, a generated first received signal 711, a first cross-correlation signal 712 between the first received signal 711 and a transmission signal, and a first detection distance graph 713 using the first cross-correlation signal 712. Also, FIG. 7 shows, when zero is inserted into vacant positions of the third input data, a generated second received signal 714, a second cross-correlation signal 715 between the second received signal 714 and a transmission signal, and a second detection distance graph 716 using the second cross-correlation signal 715.

As shown in FIG. 7, it may be seen that as zero is inserted into the vacant positions of the third input data, a non-computable region 714a of the second received signal 714 is stabilized. Accordingly, it may be seen that a non-computable region 715a of the second cross-correlation signal 715 is also stabilized.

As in the first detection distance graph 713 and the second detection distance graph 716, the first cross-correlation signal 712 is unstable, thus, a detection distance rapidly varies between 0 m and 80 m. However, since the second cross-correlation signal 715 is stable, the variation of a detection distance of the second detection distance graph 716 is significantly less than the variation of a detection distance of the first detection distance graph 713.

Figure 8A:
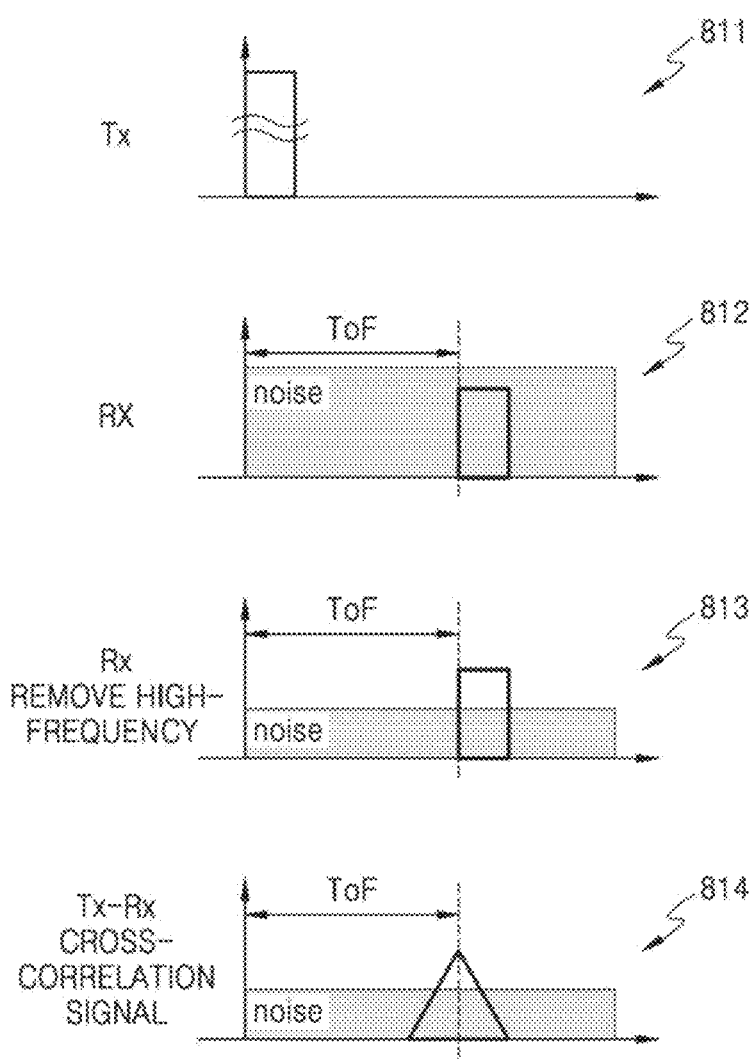
Figure 9:
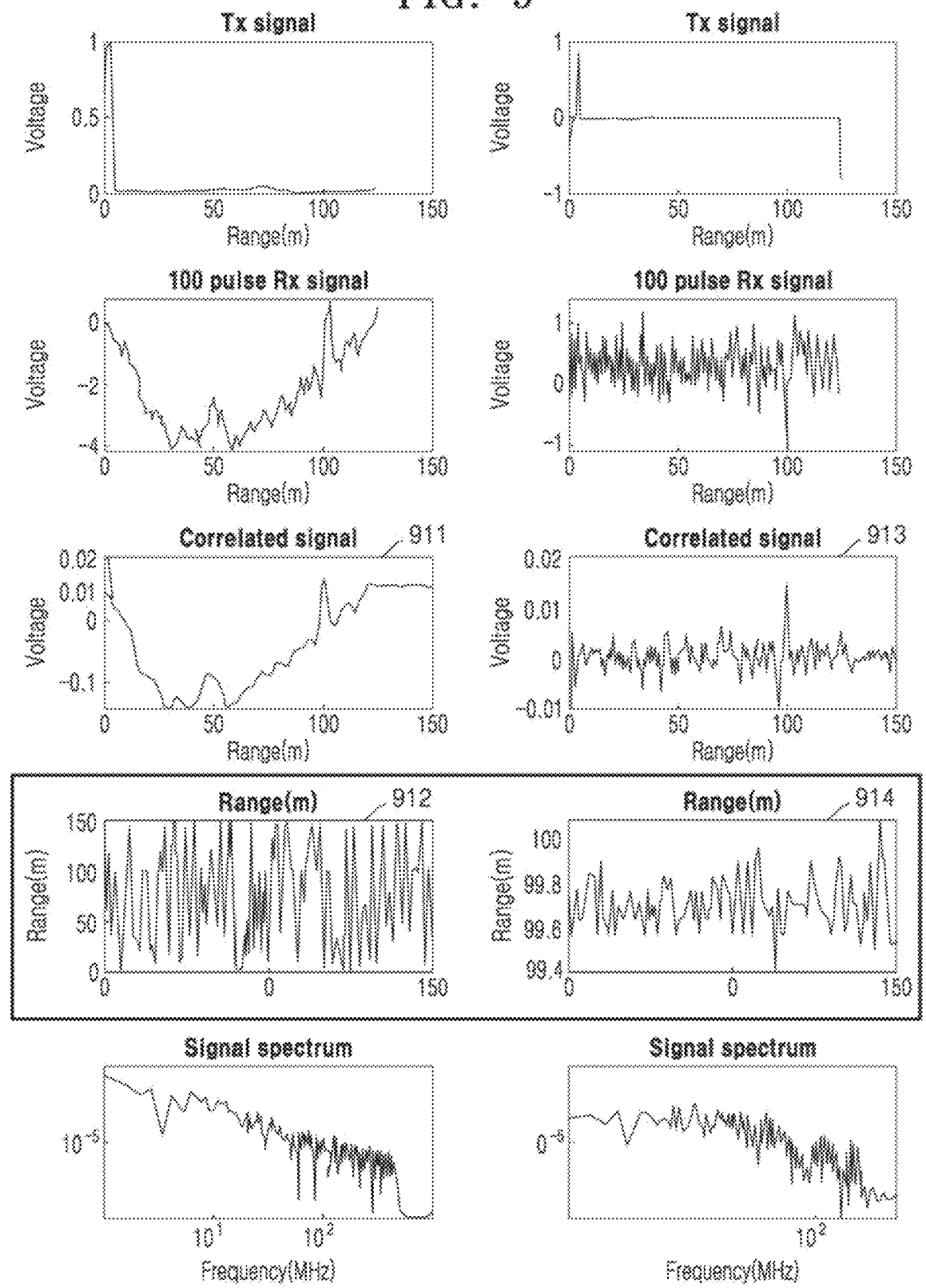
FIG. 9 is a diagram for explaining an effect of increasing a detection distance according to removal of low-frequency noise of a transmission signal and a received signal according to an example embodiment.

FIGS. 8A to 8B and 9 are diagrams for explaining an effect of increasing a detection distance according to removal of low frequency noise of a transmission signal and a received signal.

More specifically, FIG. 8A is a diagram for explaining the shape of the cross-correlation signal 814 and the effect of noise when the object detection device 100 generates the cross-correlation signal 814 between a transmission signal 811 and a received signal 812 after removing only high-frequency noise from a received signal 812. Also, FIG. 8B is a diagram for explaining the shape of a cross-correlation signal 820 and the effect of noise when the object detection device 100 generates the cross-correlation signal 820 between a transmission signal 815 and a received signal 817 after removing high-frequency noise and low-frequency noise from a received signal 816.

Referring to FIG. 8A, the object detection device 100 may receive the transmission signal 811 and the received signal 812. Since the received signal 812 is a signal reflected from an object, the size of the received signal 812 may be less than the size of the transmission signal 811. Also, noise may be included in the received signal 812.

The object detection device 100 may accumulate the received signal 812 for a predetermined time, and then, output a received signal 813 from which high-frequency noise is removed by calculating an average value of the accumulated received signal. The received signal 812 may still include a low-frequency noise component.

The object detection device 100 may generate the cross-correlation signal 814 between the transmission signal 811 and the reception signal 813 from which high-frequency noise is removed. The object detection device 100 may calculate a ToF of light based on a peak of the cross-correlation signal 814 and generate a point cloud based on the ToF of light.

As shown in FIG. 8A, when the object detection device 100 generates a cross-correlation signal 814 after removing only high-frequency noise, since the cross-correlation signal 814 includes low-frequency noise and the sharpness of the cross-correlation signal 814 is low, the object detection device 100 may not detect an accurate peak in the cross-correlation signal 814. Also, the detection of inaccurate peaks leads to rapid variations in the detection distance.

On the other hand, the object detection device 100 according to an example embodiment generates a cross-correlation signal after removing not only high-frequency noise but also low-frequency noise, thereby improving the detection distance.

Specifically, in FIG. 8B, the object detection device 100 according to an example embodiment may receive the transmission signal 815 and the received signal 816. The transmission signal 815 of FIG. 8B may correspond to the transmission signal 811 of FIG. 8A, and the received signal 816 of FIG. 8B may correspond to the received signal 812 of FIG. 8A.

The object detecting device 100 may output a received signal 818 from which high-frequency noise is removed by accumulating the received signal 817 for a predetermined time and calculating an average value of the accumulated received signal.

Also, the object detection device 100 may output the transmission signal 816 from which low-frequency noise is removed and a received signal 819 from which low-frequency noise is removed by subtracting elements that correspond to each other after element-shifting each of the transmission signal 815 and the received signal 818.

The object detection device 100 may generate a cross-correlation signal 820 between the transmission signal 816 from which low-frequency noise is removed and a received signal 819 from which low-frequency noise is removed. The object detection device 100 may calculate a ToF of light based on the peak of the cross-correlation signal 820 and generate a point cloud based on the ToF of light.

As shown in FIG. 8B, it may be seen that noise of the cross-correlation signal 820 is mostly removed. Also, since the cross-correlation signal 820 is generated based on the transmission signal 816 from which low-frequency noise is removed and the received signal 819 from which low-frequency noise is removed, the sharpness of the cross-correlation signal 820 may be high. Accordingly, the object detection device 100 may further accurately detect a peak value from the cross-correlation signal 820, and accordingly, the detection distance of the object detection device 100 may be improved.

FIG. 9 shows a third detection distance graph 911 representing a case that the object detection device 100 generates a cross-correlation signal 911 after removing only high-frequency noise and a fourth detection distance graph 912 representing a case that the object detection device 100 generates a cross-correlation signal 913 after removing both high-frequency and low-frequency noise. In FIG. 9, the magnitude of a transmission signal is 1 V, and a received signal is accumulated 100 times.

As shown in FIG. 9, when the object detection device 100 generates the cross-correlation signal 911 after removing only high-frequency noise, since a correct peak position may not be detected in the cross-correlation signal 911, the detection distance may rapidly vary between 0 m to 150 m. However, when the object detection device 100 generates the cross-correlation signal 913 after removing the high-frequency noise and low-frequency noise, since the correct peak position may be detected in the cross-correlation signal 913, the variation in the detection distance is remarkably reduced.

Figure 10:
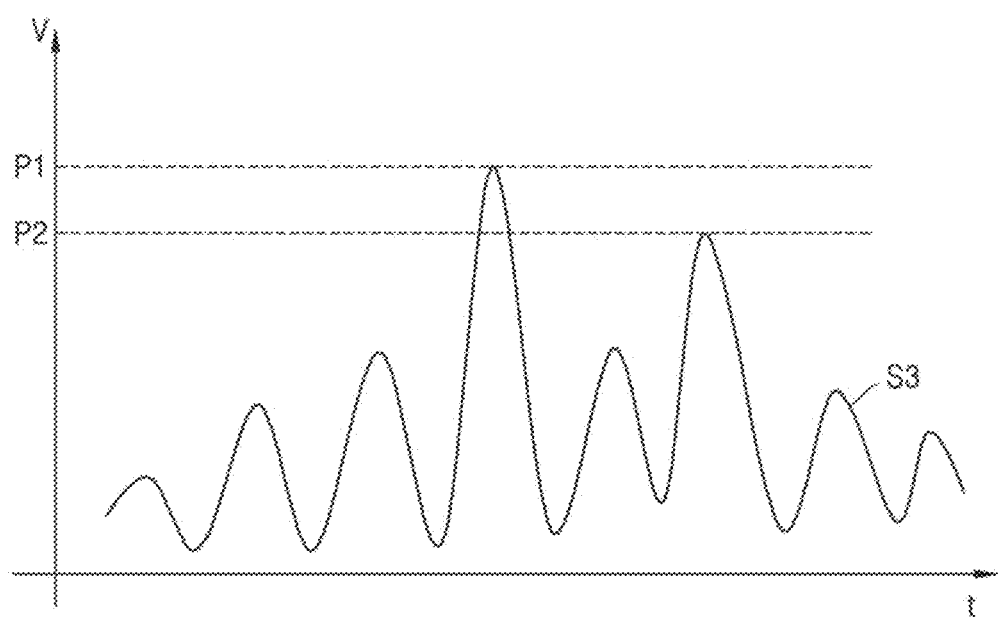
FIG. 10 is a graph for explaining a method of calculating quality of a cross-correlation signal according to an example embodiment.

FIG. 10 is a graph for explaining a method of calculating a quality of a cross-correlation signal according to an example embodiment.

In FIG. 10, the x-axis represents time, and the y-axis represents voltage or current.

Referring to FIG. 10, the peak detection unit 133 may detect a first peak value P1 having the largest absolute value among peak values of a cross-correlation signal S3. Also, the peak detection unit 133 may detect a second peak value P2 having the largest absolute value among remaining peak values excluding the first peak value P1. The peak detection unit 133 may output the first peak value P1 and the second peak value P2 to the quality calculation unit 134.

The quality calculation unit 134 may calculate the quality of a cross-correlation signal based on the absolute value of the first peak value P1 and the absolute value of the second peak value P2.

In one embodiment, the quality calculation unit 134 may calculate the quality of the cross-correlation signal by using any one of the following Equations 2 to 5.

$$S_{QoS} = ||P1| - |P2|| \quad \text{[Equation 2]}$$

$$S_{QoS} = \left|\frac{|P1|}{|P2|}\right| \quad \text{[Equation 3]}$$

$$S_{QoS} = \log(||P1| - |P2||) \quad \text{[Equation 4]}$$

$$S_{QoS} = \log\left(\left|\frac{|P1|}{|P2|}\right|\right) \quad \text{[Equation 5]}$$

In equations 2 to 5, SQoS may be a quality of a cross-correlation signal, P1 may be a first peak value, and P2 may be a second peak value.

The point cloud generation unit 135 may generate a point cloud based on a cross-correlation signal having a predetermined reference quality or greater. In other words, the point cloud generation unit 135 may ignore the cross-correlation signal having a small difference, ratio, etc. between the first peak value P1 and the second peak value P2.

As the point cloud generation unit 135 generates a point cloud based on a cross-correlation signal having a predetermined reference quality or greater, the possibility of false detection of an object may be significantly reduced.

Figure 11:
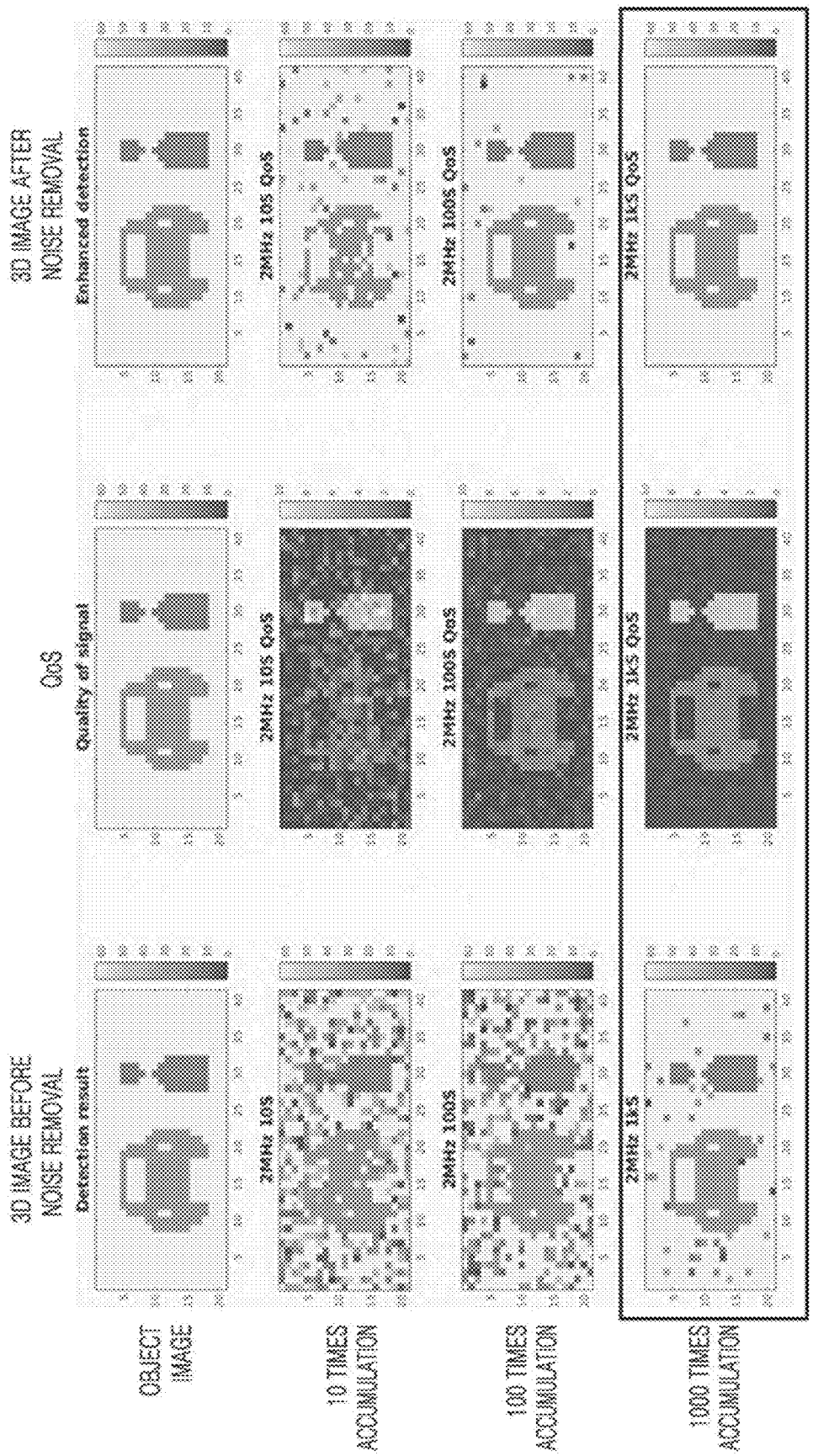
FIG. 11 is a diagram for explaining a false detection prevention effect according to the quality calculation of a cross-correlation signal according to an example embodiment.

FIG. 11 is a diagram for explaining a false detection prevention effect according to the quality calculation of a cross-correlation signal.

Referring to FIG. 11, an original image, a cross-correlation signal having a predetermined quality or greater, and an object image from which noise is removed are shown.

As shown in FIG. 11, as the quality of the cross-correlation signal is determined and a 3D image is generated based on the determined quality, the object detection device 100 may acquire a 3D image as the same as the original image.

Figure 12:
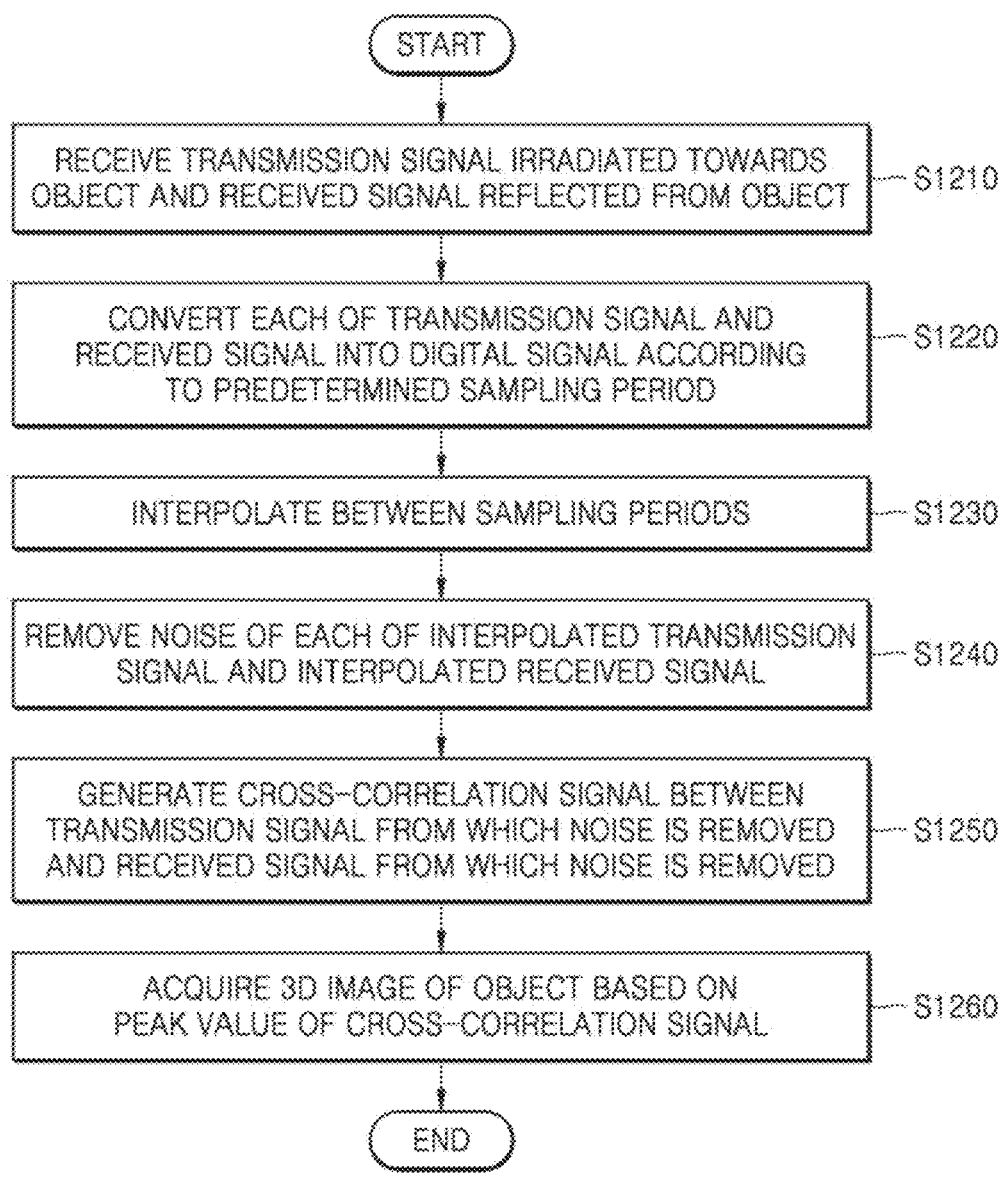
FIG. 12 is a flowchart of a method of object detection according to an embodiment according to an example embodiment.

FIG. 12 is a flowchart of a method of object detection according to an example embodiment.

Referring to FIG. 12, in operation S1210, the object detection device 100 may receive a transmission signal radiated toward the object and a received signal reflected from the object. At this point, the transmission signal may denote a part of the transmission signal transmitted toward the object.

In operation S1220, the object detection device 100 may convert each of the transmission signal and the received signal into a digital signal according to a predetermined sampling period.

The object detection device 100 may output a digital signal as vector data in the form of a column vector or row vector. The vector data may denote an array in the form of a column vector or row vector including a set of elements. Quantized values of a transmission signal and a received signal may be stored in each element.

In operation S1230, the object detection device 100 may interpolate between sampling periods.

The object detection device 100 may interpolate between each element included in the vector data by predicting the elements between sampling periods. For example, the object detection device 100 may interpolate a transmission signal and a received signal by using at least one of a linear interpolation method, a polynomial interpolation method, a spline interpolation method, an exponential interpolation method, a log-linear interpolation method, a Lagrange interpolation method, a newton interpolation method, and a bilinear interpolation method. However, the interpolation method described above is only an example of an interpolation method, and various interpolation methods for interpolating a transmission signal and a received signal may be used.

In operation S1240, the object detection device 100 may remove noise of each of the interpolated transmission signal and the interpolated received signal.

The object detection device 100 may remove high-frequency noise of each of the interpolated transmission signal and the interpolated received signal, and then remove low-frequency noise of each of the transmission signal from which the high-frequency noise is removed and the received signal from which the high-frequency noise is removed.

The method of noise removal by the object detection device 100 will be described more in detail with reference to FIGS. 14 and 15.

In operation S1250, the object detection device 100 may generate a cross-correlation signal between a transmission signal from which noise is removed and a received signal from which noise is removed.

The object detection device 100 may generate a cross-correlation signal between a transmission signal from which noise is removed and a received signal from which noise is removed by using Equation 1 described above, but is not limited thereto.

In operation S1260, the object detection device 100 may acquire a 3D image of an object based on a peak value of the cross-correlation signal.

Figure 13:
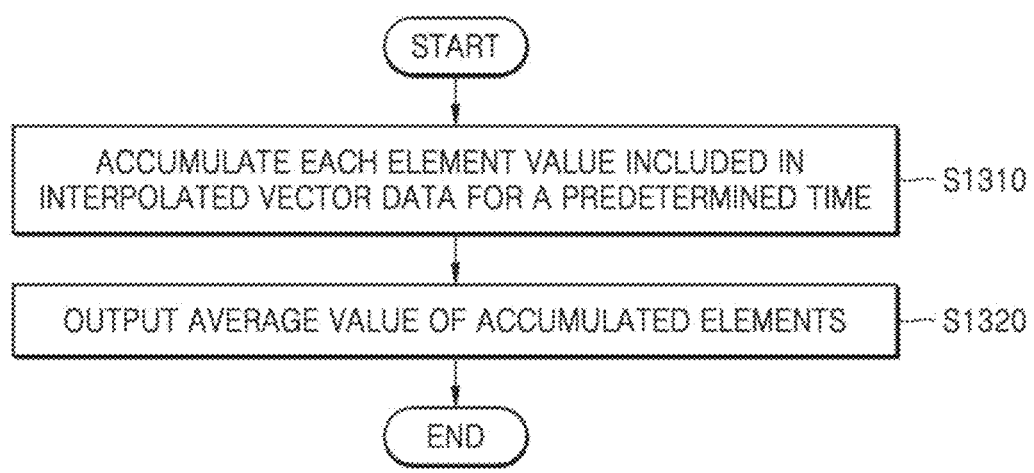
FIG. 13 is a flowchart for explaining a method of removing high-frequency noise in the method of FIG. 12 according to an example embodiment.

FIG. 13 is a flowchart for explaining a method of removing high-frequency noise of FIG. 12.

Referring to FIG. 13, in operation S1310, the object detection device 100 may accumulate each element value included in the interpolated vector data for a predetermined time.

In operation S1320, the object detection device 100 may remove high frequency noise by outputting an average value of the accumulated elements.

According to an example embodiment, each operation of FIG. 13 may be performed only on a received signal.

Figure 14:
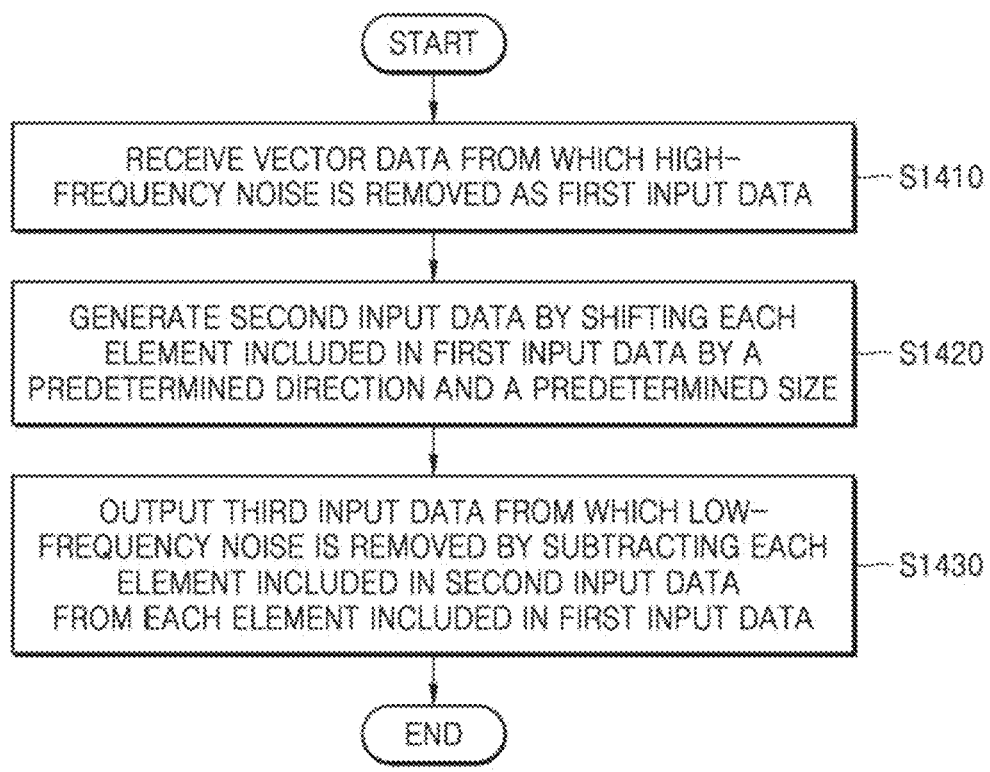
FIG. 14 is a flowchart for explaining a method of removing low-frequency noise in the method of FIG. 12 according to an example embodiment.

FIG. 14 is a flowchart for explaining a method of removing low-frequency noise of FIG. 12.

Referring to FIG. 14, in operation S1410, the object detection device 100 may receive vector data from which high-frequency noise is removed as first input data.

In operation S1420, the object detection device 100 may generate second input data by shifting each element included in the first input data by a predetermined direction and a predetermined size.

The predetermined direction may be any one of left, right, upper, and lower directions. When the vector data is a row vector, the predetermined direction may be set to the left or right. At this point, the left side may denote a direction in which the column address of the vector data decreases, and the right side may denote a direction in which the column address of the vector data increases. Also, when the vector data is a column vector, the predetermined direction may be set to an upper side or a lower side. At this point, the upper side may denote a direction in which the row address of the vector data decreases, and the lower side may denote a direction in which the row address of the vector data increases. The predetermined size may be set to 500 elements.

When shifting an element, the object detection device 100 may delete elements outside the column address range. Accordingly, the length of the second input data may be less than the length of the first input data.

In operation S1430, the object detection device 100 may output third input data from which low-frequency noise is removed by subtracting each element included in the second input data from each element included in the first input data.

The object detection device 100 may subtract elements arranged at column addresses corresponding to each other in the first input data and the second input data.

The object detection device 100 may store the subtracted element in the third input data. At this point, the object detection device 100 may store the subtracted element in a location of the third input data corresponding to the column address of the first input data and the second input data.

On the other hand, when there is no element of the second input data corresponding to the element selected from the first input data, the object detection device 100 may insert zero at a location of the third input data corresponding to the column address of the first input data.

FIG. 15 is a flowchart for explaining a method of acquiring a 3D image of FIG. 12.

Referring to FIG. 15, in operation S1510, the object detection device 100 may detect at least one peak value in a cross-correlation signal.

The object detecting device 100 may detect a first peak value having the largest absolute value among the peak values of the cross-correlation signal. Also, the object detecting device 100 may detect a second peak value having the largest absolute value among remaining peak values excluding the first peak value.

In operation S1520, the object detection device 100 may determine the quality of the cross-correlation signal based on the peak value.

The object detecting device 100 may determine the quality of the cross-correlation signal based on the absolute value of the first peak value and the absolute value of the second peak value. The object detection device 100 may determine the quality of the cross-correlation signal according to Equations 2 to 5.

In operation S1530, the object detection device 100 may generate a point cloud based on the cross-correlation signal having a predetermined quality or greater.

The object detection device 100 may calculate a transmission time of a transmission signal and a received time of a received signal based on a first peak value of a cross-correlation signal having a reference quality or greater. Also, the object detection device 100 may calculate a ToF of light output from the transmitter 110 based on the transmission time and the received time. Also, the object detection device 100 may calculate a distance to an object based on the ToF of light. Also, the object detection device 100 may generate a 3D point cloud based on the distance information to the object.

The object detection device 100 may ignore the peak value of the cross-correlation signal having a quality less than the reference quality. Also, the object detection device 100 may map maximum detection distance information to a point cloud corresponding to a cross-correlation signal having a quality less than the reference quality.

In operation S1540, the object detection device 100 may acquire a 3D image based on the generated point cloud.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An object detection device comprising:
   a converter configured to convert a part of a transmission signal received from a transmitter and a received signal acquired through a reflection of another part of the transmission signal from an object, into a digital transmission signal and a digital received signal, respectively, according to a predetermined sampling period; and
   at least one processor configured to:
   interpolate between elements of the digital transmission signal and the digital received signal that have the predetermined sampling period, to obtain an interpolated transmission signal and an interpolated received signal;
   remove noise from each of the interpolated transmission signal and the interpolated received signal;
   generate a cross-correlation signal between the interpolated transmission signal from which the noise is removed and the interpolated received signal from which the noise is removed; and
   acquire a three-dimensional (3D) image of the object based on at least one peak value of the cross-correlation signal.

2. The object detection device of claim 1, wherein the converter is configured to output each of the part of transmission signal and the received signal by converting each of the part transmission signal and the received signal into vector data in a form of a column vector or a row vector.

3. The object detection device of claim 2, wherein the least one processor is further configured to interpolate between each of a plurality of elements included in the vector data.

4. The object detection device of claim 3, wherein the least one processor is further configured to remove high-frequency noise by accumulating each of the elements included in the interpolated vector data for a predetermined time and outputting an average value of the accumulated elements, and
   wherein the high-frequency noise is a portion of the noise having a frequency higher than a predetermined upper threshold.

5. The object detection device of claim 4, wherein the least one processor is further configured to:
receive the vector data from which the high-frequency noise is removed as first input data,
generate a second input data by shifting each first element included in the first input data in a predetermined direction by a predetermined size, and
output third input data from which low-frequency noise is removed by subtracting each second element included in the second input data from each first element included in the first input data, and
wherein the low-frequency noise is a portion of the noise having a frequency lower than a predetermined lower threshold.

6. The object detection device of claim 5, wherein the least one processor is further configured to insert zero into the third input data when there is no second element of the second input data corresponding to any first element of the first input data.

7. The object detection device of claim 1, wherein the least one processor is further configured to:
detect the at least one peak value from the cross-correlation signal,
determine quality of the cross-correlation signal based on the at least one peak value, and
acquire the 3D image of the object based on the quality of the cross-correlation signal.

8. The object detection device of claim 7, wherein the least one processor is further configured to:
detect a first peak value having a largest absolute value among the at least one peak value of the cross-correlation signal,
detect a second peak value having a second largest absolute value among the at least one peak value of the cross-correlation signal, and
determine the quality of the cross-correlation signal based on the absolute value of the first peak value and the absolute value of the second peak value.

9. The object detection device of claim 8, wherein the least one processor is further configured to:
generate a point cloud based on the cross-correlation signal having a quality that is greater than or equal to a predetermined reference quality, and
acquire the 3D image of the object based on the generated point cloud.

10. A method for object detection, the method comprising:
converting a part of a transmission signal received from a transmitter and a received signal acquired through a reflection of another part of the transmission signal from an object, into a digital transmission signal and a digital received signal, respectively, according to a predetermined sampling period;
interpolating between elements of the digital transmission signal and the digital received signal that have the predetermined sampling period, to obtain an interpolated transmission signal and an interpolated received signal;
removing noise from each of the interpolated transmission signal and the interpolated received signal;
generating a cross-correlation signal between the interpolated transmission signal from which the noise is removed and the interpolated received signal from which the noise is removed; and
acquiring a three-dimensional (3D) image of the object based on at least one peak value of the cross-correlation signal.

11. The method of claim 10, wherein the converting comprises converting each of the part of the transmission signal and the received signal into vector data in a form of a column vector or a row vector, and
the interpolating comprises interpolating between each of a plurality of elements included in the vector data.

12. The method of claim 11, wherein the removing the noise comprises:
accumulating each of the elements included in the vector data for a predetermined time, and removing high-frequency noise by outputting an average value of the accumulated elements;
receiving the vector data from which the high-frequency noise is removed as first input data;
generating second input data by shifting each first element included in the first input data in a predetermined direction by a predetermined size; and
outputting third input data from which low-frequency noise is removed by subtracting each second element included in the second input data from each first element included in the first input data, and
wherein the high-frequency noise is a portion of the noise having a frequency higher than a predetermined upper threshold.

13. The method of claim 12, wherein the outputting the third input data comprises inserting zero into the third input data when there is no second element of the second input data corresponding to any first element of the first input data.

14. The method of claim 10, wherein the acquiring comprises:
detecting the at least one peak value in the cross-correlation signal;
determining quality of the cross-correlation signal based on the at least on peak value; and
acquiring the 3D image of the object based on the quality of the cross-correlation signal.

15. The method of claim 14, wherein the detecting comprises:
detecting a first peak value having a largest absolute value among the at least one peak value of the cross-correlation signal; and
detecting a second peak value having a second largest absolute value among the at least one peak value of the cross-correlation signal,
the determining comprises determining the quality of the cross-correlation signal based on the absolute value of the first peak value and the absolute value of the second peak value, and
wherein the acquiring comprises:
generating a point cloud based on the cross-correlation signal having a quality that is greater than or equal to a predetermined reference quality; and
acquiring the 3D image of the object based on the generated point cloud.

* * * * *